US009920631B2

(12) United States Patent
Tellier et al.

(10) Patent No.: US 9,920,631 B2
(45) Date of Patent: Mar. 20, 2018

(54) METHOD FOR DISASSEMBLING A REINFORCEMENT FROM A PART

(71) Applicant: SNECMA, Paris (FR)

(72) Inventors: Florian Tellier, Yerres (FR); Adrien Paixao, Aulnay Sous Bois (FR)

(73) Assignee: SNECMA, Paris (FR)

( * ) Notice: Subject to any disclaimer, the term of this patent is extended or adjusted under 35 U.S.C. 154(b) by 493 days.

(21) Appl. No.: 14/385,926

(22) PCT Filed: Mar. 21, 2013

(86) PCT No.: PCT/FR2013/050601
§ 371 (c)(1),
(2) Date: Sep. 17, 2014

(87) PCT Pub. No.: WO2014/001662
PCT Pub. Date: Jan. 3, 2014

(65) Prior Publication Data
US 2015/0026980 A1   Jan. 29, 2015

(30) Foreign Application Priority Data

Mar. 28, 2012 (FR) ...................... 12 52805

(51) Int. Cl.
*B23P 17/00* (2006.01)
*F01D 5/14* (2006.01)
(Continued)

(52) U.S. Cl.
CPC .............. *F01D 5/147* (2013.01); *B23P 17/00* (2013.01); *F01D 5/005* (2013.01); *F01D 5/282* (2013.01);
(Continued)

(58) Field of Classification Search
CPC .... F04D 29/285; F04D 29/388; F04D 29/324; F01D 5/147; F01D 5/282; F01D 5/005;
(Continued)

(56) References Cited

U.S. PATENT DOCUMENTS 2,439,830 A * 4/1948 Varela .................... B23K 9/202
219/98
2,460,007 A * 1/1949 Hasselquist ............... B25B 9/00
254/1
(Continued)

FOREIGN PATENT DOCUMENTS

WO    WO 2012150144 A1 * 11/2012 ........... B23K 11/002

OTHER PUBLICATIONS

International Search Report dated Oct. 11, 2013 in PCT/FR13/050601 Filed Mar. 21, 2013.

*Primary Examiner* — Ryan J Walters
*Assistant Examiner* — Lawrence Averick
(74) *Attorney, Agent, or Firm* — Oblon, McClelland, Maier & Neustadt, L.L.P.

(57) ABSTRACT

A method of disassembling reinforcement from a part, the method including: fastening at least one metal stud on one side wall of the reinforcement and at least one other metal stud on the other side wall of the reinforcement, the studs extending substantially perpendicularly to the side walls on which they are fastened; moving the studs apart from each other to space apart the side walls of reinforcement and disengage snap-fastener mechanisms thereof from complementary mechanisms of the part; and removing the reinforcement from the part.

4 Claims, 4 Drawing Sheets

(51) Int. Cl.
*F01D 25/00* (2006.01)
*F01D 5/00* (2006.01)
*F01D 5/28* (2006.01)
*F01D 25/28* (2006.01)
*F04D 29/32* (2006.01)
*F04D 29/38* (2006.01)
*F04D 29/54* (2006.01)

(52) U.S. Cl.
CPC ............ *F01D 5/288* (2013.01); *F01D 25/00* (2013.01); *F01D 25/285* (2013.01); *F04D 29/324* (2013.01); *F04D 29/388* (2013.01); *F04D 29/541* (2013.01); *F05D 2240/303* (2013.01); *Y10T 29/49318* (2015.01); *Y10T 29/49817* (2015.01); *Y10T 29/53683* (2015.01)

(58) Field of Classification Search
CPC ......... Y10T 29/49318; Y10T 29/49817; Y10T 29/53683; Y10T 29/49728; F05D 2240/303; B23P 6/002; B23P 6/005; B23P 19/04; B23P 6/007; B25B 3/00; B25B 5/067; B25B 5/082; B25B 5/125; B23Q 3/101
USPC ... 219/617, 54, 55, 60.2, 78.01, 86.23, 86.7, 219/86.8, 121.13; 81/485, 487, 302, 303, 81/418, 421, 424.5, 426.5; 29/268, 278, 29/271
See application file for complete search history.

(56) References Cited

U.S. PATENT DOCUMENTS

| | | | | |
|---|---|---|---|---|
| 3,132,550 | A | | 5/1964 | Sion |
| 3,801,772 | A | * | 4/1974 | Curcio ................. B21D 1/06 219/98 |
| 3,856,434 | A | * | 12/1974 | Hoffmann ............. F01D 5/147 416/184 |
| 4,289,050 | A | * | 9/1981 | Scafaro ................ B25B 7/02 81/302 |
| 4,698,051 | A | * | 10/1987 | Jacobson .............. B65B 43/30 294/99.2 |
| 4,924,056 | A | * | 5/1990 | Bevilacqua ........... B23K 9/202 219/107 |
| 5,358,379 | A | * | 10/1994 | Pepperman ........... B23P 6/005 415/191 |
| 6,993,999 | B2 | * | 2/2006 | Wong .................... B25B 7/02 81/302 |
| 9,279,328 | B2 | * | 3/2016 | Roy ...................... F01D 5/147 |
| 2004/0074348 | A1 | * | 4/2004 | Battistone ............ B25B 27/205 81/302 |
| 2010/0104461 | A1 | * | 4/2010 | Smith .................. F04D 25/088 417/423.1 |
| 2014/0030106 | A1 | * | 1/2014 | Schreiber ............. F04D 29/324 416/241 A |
| 2014/0193271 | A1 | * | 7/2014 | Dudon .................. B23P 15/04 416/241 R |
| 2014/0224774 | A1 | * | 8/2014 | Chergui ................ B23K 11/002 219/91.2 |

* cited by examiner

METHOD FOR DISASSEMBLING A REINFORCEMENT FROM A PART

BACKGROUND OF THE INVENTION

Field of the Invention

The invention relates to a method of disassembling reinforcement from a part, such as a turbine engine vane, and also to tooling enabling such a method to be performed.

Description of the Related Art

In order to reduce the weight and the cost of certain vanes or blades of a turbine engine, and in particular guide vanes for a bypass stream, such vanes or blades are generally made of composite material. Since they need to withstand considerable amounts of wear by erosion and impacts that result from the flow of air and water molecules and also from friction therewith, and that also result from impacts against particles or foreign bodies that can penetrate into the engine, their leading edges are protected by means of metal reinforcement fastened on the airfoils of the vanes or blades.

A set of guide vanes for the bypass stream in a turbine engine comprises two annular shrouds that are coaxial, respectively an inner shroud and an outer shroud, with substantially radial vanes extending between them. Each of the vanes presents curvature along the longitudinal axis of the set of vanes, which curvature is not constant along its entire height or radial dimension, such that the profile of a leading edge may vary along its height. By way of example, in a particular embodiment, the leading edge of each vane in a set of guide vanes in certain engines may have seven different profiles.

In the prior art, the leading edge of a vane of this type may be reinforced by means of metal reinforcement that is fitted on and adhesively bonded to the upstream longitudinal edge of the airfoil of the vane. Nevertheless, that technology presents drawbacks. Specifically, the bonding step is relatively lengthy and is in addition to the various steps involved in fabricating a vane. Furthermore, it is difficult to inspect adhesive bonding for quality and reliability, such that there remains a risk of reinforcement lifting off, which can be dangerous in operation.

Furthermore, in the event of wear or impact, the reinforcement of a vane may need to be removed and replaced by new reinforcement during a maintenance operation. Nevertheless, because adhesively-bonded reinforcement cannot be disassembled, it is necessary to destroy it in order to remove it, with this requiring an operation that is lengthy and difficult, and that can lead to damage to the airfoil. Because of the uncontrolled level of damage to which the airfoil might be subjected during this operation, and because the conditions required for polymerizing the adhesive in order to procure bonding have an affect on the material soundness of the airfoil, a limit is put on the number of reinforcement repair operations that can be performed on a vane during its lifetime.

BRIEF SUMMARY OF THE INVENTION

An object of the invention is to provide a solution to these problems of the prior art that is simple, effective, and inexpensive.

The invention relates in particular to a turbine engine vane or blade comprising an airfoil and reinforcement on at least one edge of the airfoil, in particular on its leading edge and/or on its trailing edge, the reinforcement covering or forming the or each above-mentioned edge of the airfoil and extending substantially over the entire longitudinal dimension of that edge, the vane or blade being characterized in that the reinforcement is fastened in releasable manner to the airfoil and includes resilient snap-fastener means co-operating with complementary means of the airfoil.

The reinforced edge of the airfoil may be its leading edge, its trailing edge, or indeed some other edge of the airfoil such as the edge at the tip of the airfoil.

The reinforcement is thus fastened to the airfoil of the blade or vane by resilient snap-fastening, thereby enabling it to be disassembled, in order to be replaced by new reinforcement during a maintenance operation, this operation being simpler and less lengthy than in the prior art. A blade or vane of the invention may have its reinforcement replaced several times during its lifetime without running the risk of damaging it, which is more economic than in the prior art. Furthermore, the adhesive-bonding step of the prior art, which in itself is of poor reliability, is no longer used, thereby eliminating the above-mentioned drawbacks associated with using an adhesive.

According to another characteristic of the invention, the reinforcement is formed by an elongate section member in the form of a rail of substantially U-, V-, or C-shaped section, and on its inner surface it includes projecting or recessed means co-operating with means of the airfoil that are of substantially complementary shape for holding the reinforcement on the airfoil. During resilient snap-fastening, the opening of the section member needs to become enlarged, thereby leading to elastic deformation of the reinforcement, in particular in its middle portion.

The reinforcement may be of the type comprising two side walls connected together by a middle wall defining the above-mentioned edge of the airfoil. While the section member is being mounted, the side walls need to be spaced apart from each other to allow the snap-fastener means to become engaged in the grooves in the airfoil. Each side wall may include one or more longitudinal rims or lugs on its inner surface that become engaged in longitudinal grooves or orifices in the airfoil. Each side wall may include two rims of this type in order to mitigate the risk of one of the rims breaking in operation.

In an embodiment of the invention, the free longitudinal edge of each side wall is folded inwards and towards the middle wall, and serves to define one of the above-mentioned longitudinal rims.

In a variant, each longitudinal rim slopes relative to a normal to the corresponding side wall, towards the inside and towards the middle wall.

Advantageously, the or each longitudinal groove situated beside the pressure side of the airfoil is offset upstream or downstream relative to a longitudinal groove situated on the suction face of the airfoil. The grooves situated on one side of the airfoil are therefore not situated in register with the grooves situated on the other side of the airfoil (about a midplane containing the longitudinal axis of the airfoil), thereby limiting mechanical weakening of the airfoil and reducing the risk of cracks appearing between the grooves.

The above-mentioned edge of the airfoil may comprise a fiber structure in which the orifices or grooves are formed or that co-operate with the remainder of the airfoil to define said orifices or grooves. When the airfoil is not made from a fiber structure, the above-mentioned fiber structure may be fitted to and fastened on the upstream or downstream longitudinal edge of the airfoil by any appropriate technique. When the airfoil comprises a fiber structure, the above-mentioned fiber structure may be formed by the fiber structure of the airfoil. This type of fiber structure is for being impregnated with an appropriate resin that serves to fill in the voids between the fibers and to bond the fibers together.

In an embodiment of the invention, at least one of the side walls of the reinforcement includes an orifice or a gap, such as a notch, that is open to the outside for the purpose of engaging a tool for disassembling the reinforcement.

Assembling clearances between the reinforcement and the airfoil are preferably filled in, at least in part, by a gasket or a coating in the form of a covering film or paint, for example, thereby covering at least a portion of the surface of the airfoil that is to be covered by the reinforcement.

The invention also provides a set of guide vanes for the bypass stream of a turbine engine, comprising two annular shrouds that are coaxial, respectively an inner shroud and an outer shroud, with substantially radial vanes extending between them, the set of vanes being characterized in that the vanes are as defined above.

The invention provides a method of disassembling reinforcement from a part, said reinforcement being releasably fastened on the part and including resilient snap-fastener means co-operating with complementary means of the part, the method comprising the steps consisting in:

fastening at least one metal stud on one side wall of the reinforcement and at least one other metal stud on the other side wall of the reinforcement, these studs extending substantially perpendicularly to the side walls on which they are fastened;

moving the studs apart from each other in order to space apart the side walls of the reinforcement and disengage their snap-fastener means from the complementary means of the airfoil; and removing the reinforcement from the airfoil.

The invention can thus be applied to any type of part including removable reinforcement, and it is not limited to being applied solely to a turbine engine blade or vane.

Advantageously, the studs are fastened to the reinforcement by surface welding, the studs being used as electrodes for the welding during which at least one electric arc is to be generated between the reinforcement and the end of each stud in order to melt said end or to melt a filler metal, the molten metal serving to fasten the stud to the reinforcement. By way of example, the welding may be of the metal inert gas-tungsten inert gas-metal active gas (MIG-TIG-MAG) type or of the shielded metal arc welding (SMAW) type. This welding method is performed locally and on the surface, thereby avoiding damage to the composite structure by raising its temperature.

The studs may be fastened respectively to the ends of two branches of a pair of pliers that is used for spacing the studs apart from each other.

Preferably, the part is a turbine engine vane or blade, comprising an airfoil and a piece of reinforcement on at least one edge of the airfoil, and in particular on the leading edge and/or on the trailing edge of the airfoil, the or each piece of reinforcement covering or forming the above-mentioned edge of the airfoil and extending substantially over the entire longitudinal dimension of that edge, the reinforcement being releasably fastened on the airfoil and including resilient snap-fastener means co-operating with complementary means of the airfoil.

The invention also provides tooling for performing the above-specified method, the tooling being characterized in that it comprises a tool in the form of a pair of pliers having branches with free ends carrying studs that are to be fastened by welding to the side walls of the reinforcement.

Preferably, the studs are releasably fastened to the branches of the tool.

Under such circumstances, each branch of the tool may have a cylindrical end including an axial bore in which the body of a stud is engaged.

Advantageously, each cylindrical end includes a tapped orifice opening into the inside of the bore and having a lock screw mounted therein to prevent the stud from moving axially in the bore.

According to a characteristic of the invention, the studs are made of meltable material.

Furthermore, each stud may be connected by a conductor to a terminal of an electrical power supply.

BRIEF DESCRIPTION OF THE SEVERAL VIEWS OF THE DRAWINGS

The invention can be better understood and other details, advantages, and characteristics of the invention appear more clearly on reading the following description made by way of non-limiting example and with reference to the accompanying drawings, in which.

DETAILED DESCRIPTION OF THE INVENTION

Figures 1, 2, 3:
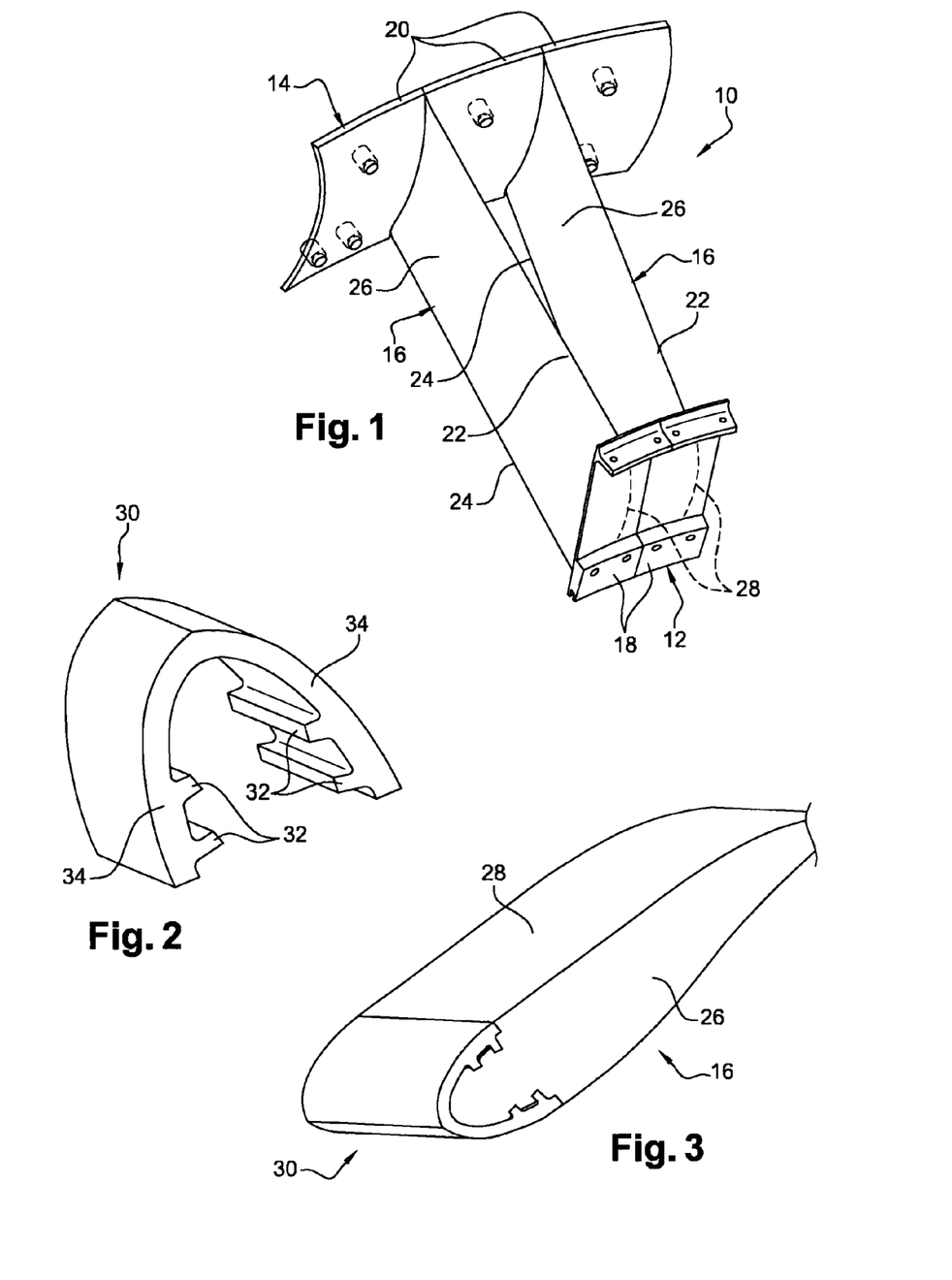
FIG. 1 is a fragmentary diagrammatic view in perspective of guide vanes for the bypass stream of a turbine engine.
FIG. 2 is a diagrammatic view in perspective of a section member for reinforcing an edge of a vane.
FIG. 3 is a diagrammatic view in perspective of a vane having the FIG. 2 reinforcing section member mounted on its leading edge.

Reference is made initially to FIG. 1, which shows a portion of a set of guide vanes 10 for the bypass stream in a bypass turbine engine, and in particular in a bypass turbojet.

The set of guide vanes 10 comprises two coaxial annular shrouds, respectively an inner shroud 12 and an outer shroud 14, one extending inside the other, the shrouds being connected together by substantially radial vanes 16. In the example shown, each of the vanes 16 is connected at its radially inner end to an inner platform 18 forming a sector of the inner shroud 12, and its radially outer end is free for mounting between two adjacent outer platforms 20 forming sectors of the outer shroud 14.

Each vane 16 comprises an airfoil having a leading edge 22 and a trailing edge 24 that are respectively upstream and downstream relative to the bypass gas stream. Each vane 16 is of curved shape having a pressure face 26 and a suction face 28. Along their height or radial dimension, the curvature of the vanes 16 may vary relative to the longitudinal axis of the set of guide vanes.

In order to enable the leading edges 22 of the vanes 16 to withstand wear and impacts, they are covered by metal reinforcement that is fitted to the airfoils of the vanes and that is fastened thereto by adhesive, in particular when the vanes are made of composite material.

Nevertheless, the technology for fastening such reinforcement on the airfoils of vanes presents the drawbacks as described above.

It is possible to remedy those problems by fastening the reinforcement on the airfoils of the vanes in releasable manner without adhesive, each piece of reinforcement including resilient snap-fastener means co-operating with complementary means carried by or formed in the airfoil of a vane. When the reinforcement is for protecting the leading edge of the airfoil, it is mounted on the leading edge or upstream longitudinal edge of the airfoil, and when it is to protect the trailing edge of the airfoil, it is mounted on the trailing edge or downstream longitudinal edge of the airfoil. Reinforcement may also be used to reinforce some other edge of an airfoil, such as an edge at the tip of the airfoil.

The reinforcement is constituted by a section member in the form of a rail having an elongate shape with a U-, V-, or C-shaped section that is for mounting on the leading or trailing edge 22 or 24 of a vane 16 by resilient snap-fastening.

Figure 4:
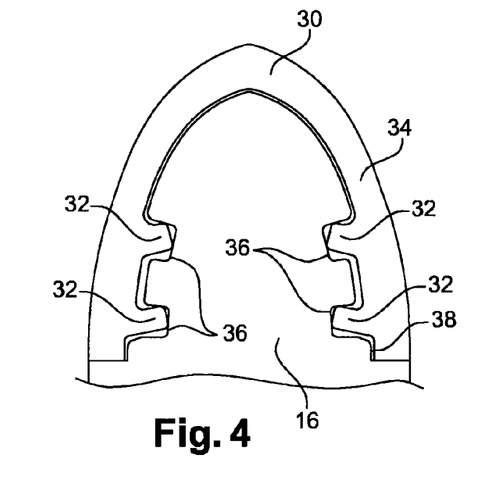
FIG. 4 is a diagrammatic view in cross-section of the leading edge of the FIG. 3 vane.

In a first embodiment as shown in FIGS. 2 to 4, the section member 30 has two side walls 34 respectively for covering a portion of the pressure face 26 of the airfoil and a portion of the suction face 28 of the airfoil, these side walls 34 being connected together by a middle wall of curved shape that covers the leading edge of the airfoil. The side walls 34 include resilient snap-fastener means that are formed to project from the facing inside surfaces of the walls 34. Each wall 34 has two longitudinal ribs or rims 32 on its inside surface that are parallel to each other and that extend inwards towards the opposite side wall.

The section member 30 may be made of stainless steel and it may be made by machining a part or it may be obtained by casting. Although the section member 30 shown in the drawings is of generally rectilinear orientation, it may have a shape that is curved or indeed twisted in order to match the shape of the leading edge of the airfoil.

Each of the pressure and suction faces 26 and 28 of the airfoil of the vane 16 has two longitudinal resilient snap-fastener grooves 36 for engaging a longitudinal rib or rim 32 of the section member 30. The airfoil also includes a small setback 38 in its upstream longitudinal edge for receiving the section member 30. The thickness of this setback 38 (e.g. about 0.1 millimeters (mm)) is substantially equal to the thickness of the section member 30, so that the outside surface of the section member is in alignment with the pressure and suction faces 26 and 28 of the airfoil, as shown in FIGS. 3 and 4.

As can be seen in FIG. 4, each rib 32 slopes relative to the normal to the inner surface of the corresponding wall 34 (this normal passing substantially through the base of the rib), towards the middle wall, i.e. upstream in the example shown. The ribs are thus of shapes that prevent the reinforcement being disassembled from the airfoil by accident.

In the example shown, the ribs 32 slope relative to the side walls of the grooves 36. In a variant, the ribs could extend parallel to the side walls of the grooves.

The grooves 36 are of shapes that are not exactly complementary to the shapes of the ribs 32, such that residual clearances exist when the section member 30 is assembled on the airfoil (FIG. 4).

These clearances may be filled in, at least in part, by means of a gasket of appropriate shape (e.g. made of silicone), or by means of a coating provided on the surfaces of the airfoil that are to be covered by the section member 30. Furthermore, the grooves 36 on the pressure and suction faces 26 and 28 are advantageously not in alignment in pairs in order to reduce the risk of cracks starting between these grooves.

Figure 5:
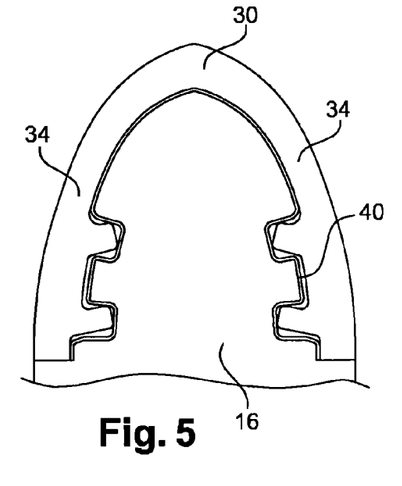
FIG. 5 is a view corresponding to the view of FIG. 4 and showing a variant embodiment.

In the embodiment of FIG. 5, all of the surfaces of the airfoil that are to be covered by the section member 30 are covered by a film 40 (e.g. of polyurethane) or by paint, the film or the paint serving to protect the material of the airfoil and/or to absorb the energy associated with particles impacting against the leading edge of the vane. In a variant, only some of the surfaces of the airfoil need be covered with this type of film or paint, for example only the inner faces of the grooves 36. In another variant, the above-mentioned clearances are filled in at least in part by parts that are fitted between the section member 30 and the airfoil, e.g. parts made of silicone.

The gaps extending between the downstream longitudinal edges of the side walls 34 of the section member 30 and the pressure and suction faces 26 and 28 of the airfoil are preferably filled in with a material of the above-mentioned type in order to provide continuity for the aerodynamic profile of the airfoil, which material preferably withstands wear and erosion.

The section member 30 is mounted on the leading edge 22 of the airfoil by resilient snap-fastening by moving the section member towards the airfoil from upstream and in a direction that is substantially perpendicular to the longitudinal axis of the vane. When the vane forms part of a set of vanes of the kind shown in FIG. 1, a piece of reinforcement is fitted onto the airfoil of each vane, which vanes may already be connected to the inner and outer platforms 12 and 14.

Figures 6, 7:
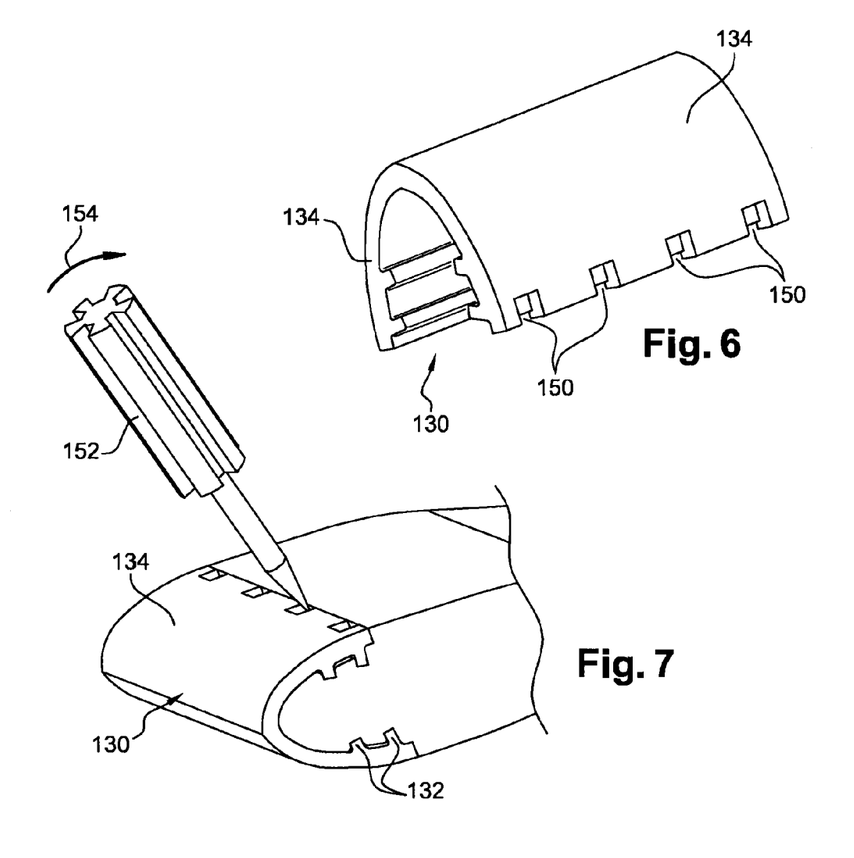
FIG. 6 is a diagrammatic view in perspective of another reinforcing section member for an edge of a vane.
FIG. 7 is a fragmentary diagrammatic view in perspective of a vane having the FIG. 6 reinforcing section member mounted on its leading edge, and it shows a step in a method of disassembling the reinforcing section member by means of a tool.

FIG. 6 shows another variant embodiment in which the section member 130 of the reinforcement differs from that described above in that it further includes notches 150 in the free longitudinal edges of its side walls 134.

In the example shown, each side wall 134 of the section member has four notches 150 (where the number of notches could be larger or smaller), which notches are regularly spaced apart from one another along the longitudinal edge of the wall. These notches 150 open to the outside in the outer surfaces of the side walls, and to the inside in their inner surfaces. The outer openings of each of the notches 150 are of section that is smaller than the section of the inner openings of the corresponding notches.

The function of these notches 150 is to make it easier to disassemble the section member 130 by allowing a tool 152, such as a spike or a screwdriver (FIG. 7) to be engaged in a notch. The tool 152 is thus engaged between the free longitudinal edge of a side wall 134 of the section member and the airfoil, as shown in FIG. 7. At least a portion of the tool 152 may be covered in silicone in order to avoid damaging the vane. The tool is used as a lever for deforming the section member a little in order to disengage the ribs 132 from the grooves in the airfoil and allow the section member to be removed. For this purpose, the end of the tool remote from the spike is moved downstream, i.e. towards the trailing edge of the vane (arrow 154), until the tool bears against the pressure or suction face of the vane and its spike engages under the side wall 134, lifting it and moving it away from the airfoil. The section member 130 can then be removed by moving it in translation in an upstream direction.

The notches 150 may be filled in with a suitable material that needs to be removed in order to allow the tool to be inserted in these notches.

In a variant, it is possible to use a different disassembly tool that is designed to be engaged in at least two notches 150 of the section member.

Figures 8, 9:
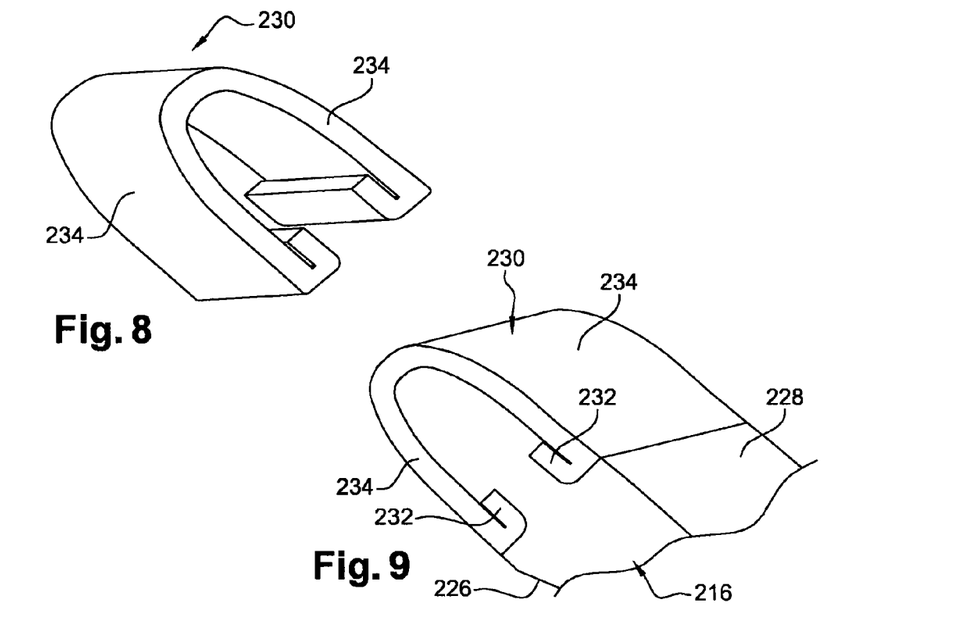
FIG. 8 is a diagrammatic view in perspective showing another reinforcing section member for an edge of a vane.
FIG. 9 is a fragmentary diagrammatic view in perspective of a vane having the FIG. 8 reinforcing section member mounted on its leading edge.

A disassembly method for disassembling a section member in accordance with the invention is described in greater detail below with reference to FIGS. 13 and 14, where the section member shown is that shown in FIGS. 8 and 9. This other disassembly method may also be used for disassembling the reinforcement of FIGS. 2 to 5.

The section member 230 of FIGS. 8 and 9 differs from that described with reference to FIGS. 2 to 4, in particular in that the resilient snap-fastener means are formed by the free longitudinal edges of its side walls 234, which edges are folded inwards and towards the middle wall so that the longitudinal end portions of these walls present a section that is substantially U-shaped. Each above-mentioned folded edge forms a rim 232 that is folded down against the inner surface of a side wall so as to form longitudinal extra thickness at the free end portion of each side wall.

The rims 232 are for engaging by resilient snap-fastening in longitudinal grooves 236 in the airfoil that are formed respectively in the pressure and suction faces 226 and 228 of the airfoil.

The section member 230 may be made from a metal sheet that is folded while hot or cold. The section member may be of a shape that is curved or indeed twisted in order to match the shape of the airfoil of the vane 216.

Figures 10, 11:
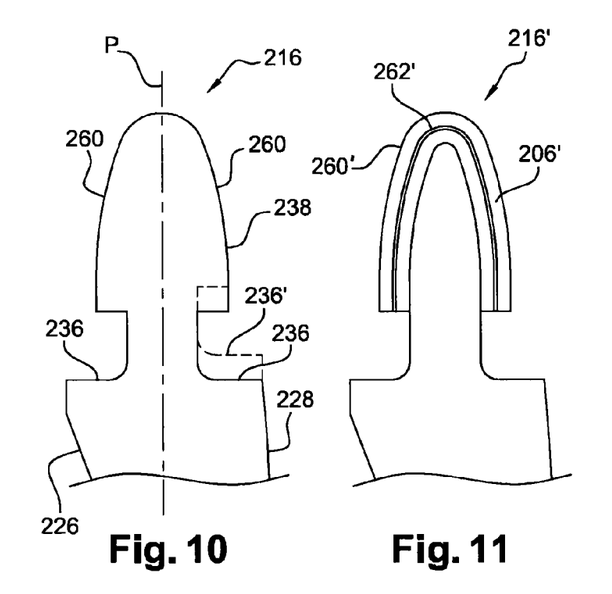
FIG. 10 is a diagrammatic view in cross-section of the leading edge of the FIG. 9 vane.
FIGS. 11 and 12 are views corresponding to FIG. 10 and showing variant embodiments.

Each of the pressure and suction faces 226 and 228 of the airfoil of the vane 216 has a respective longitudinal groove 236 for resiliently snap-fastening a rim 232 of the section member 230 (FIG. 10). The airfoil also includes a setback 238 in its upstream longitudinal edge for receiving the section member 230, the thickness of this setback 238 being substantially equal to the thickness of the section member 230, as explained above.

The grooves 236 of the airfoil may be arranged facing each other on either side of a midplane P substantially containing the longitudinal axis of the vane (FIG. 10). Nevertheless, these grooves are preferably axially offset relative to each other (as shown in dashed lines in FIG. 10 with the groove 236' on the suction face 228 being offset upstream relative to the groove 236 of the pressure face 226), so as to limit weakening the metal of the airfoil in a transverse direction as a result of the thickness of its material being small between these grooves, and so as to limit any risk of cracks appearing between the grooves.

In this example, the grooves 236, 236' of the airfoil are substantially complementary in shape to the rims 232 of the section member 230. Nevertheless, in the event of clearances appearing on assembly between the section member and the airfoil, these clearances may be filled in, at least in part, as explained above.

The section member 230 is mounted on the leading edge 222 of the airfoil by resilient snap-fastening by moving the section member towards the airfoil from upstream in a direction that is substantially perpendicular to the longitudinal axis of the vane.

For this purpose, the side walls 234 of the section member may be spaced apart from each other during assembly by means of a suitable tool, or they may become spaced apart from each other automatically as they move towards the airfoil as a result of their rims 232 sliding on convex curved sliding surfaces 260 of the upstream end portions of the airfoil.

In the embodiment of FIG. 10, the airfoil of the vane 216 is made as a single piece having the above-mentioned sliding surfaces 260 at its upstream end. This upstream end of the airfoil has a mushroom-shaped section, with its base of small thickness in the transverse direction representing the zone where the groove 236 for receiving the rims 232 of the section member 230 are situated.

In the variant shown in FIG. 11, the upstream end of the airfoil of the vane 216' has a bullet-shaped section with an upstream end portion that is covered by a fiber structure 262' that defines the above-mentioned sliding surfaces 260'. This fiber structure 262' presents a U- or V-shaped section that is engaged on the upstream end of the airfoil. On assembly, the rims 232 of the section member are designed to engage by returning resiliently downstream from the downstream ends of the fiber structure, which ends form means for axially retaining the section member 230 on the airfoil.

By way of example, the technology of FIG. 11 makes it possible to modify airfoils that already exist in the prior art so that they can receive section members 230 of the invention. The upstream longitudinal edges of such airfoils are machined and each of them receives a fiber structure of the above-mentioned described type for the purpose of defining grooves for receiving the snap-fastener means of the section members. In a variant, it is possible to obtain the vane of FIG. 11 in a single operation by means of one or more pre-impregnated sheets draped on the entire structure prior to baking.

Figure 12:
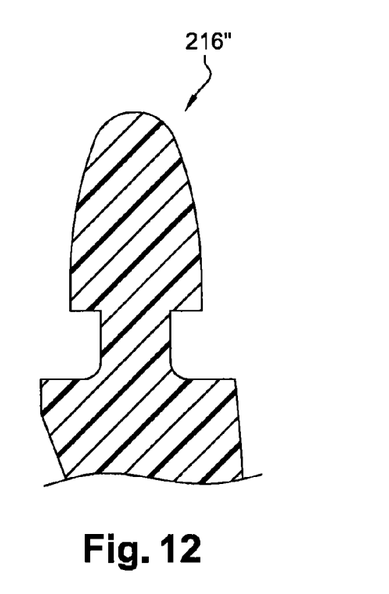

In the variant of FIG. 12, the airfoil of the vane 216" differs from that of FIG. 10 in that its material is constituted by a fiber structure.

Fiber structures for the airfoils of FIGS. 11 and 12 may be obtained by weaving fibers, such as fibers made of carbon, glass, kevlar, ceramics, etc. Such fibers are for impregnating with a resin in order to bond the fibers together.

Figure 13:
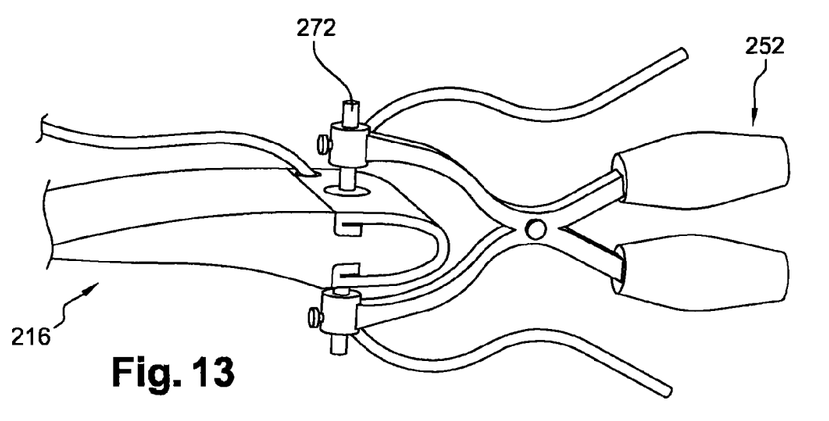
FIGS. 13 and 14 are diagrammatic views in perspective of a vane and a pair of pliers for disassembling the reinforcing section member of the vane after welding on studs, and they show the steps of the method of disassembling the reinforcing section member in accordance with the invention.
Figure 14:
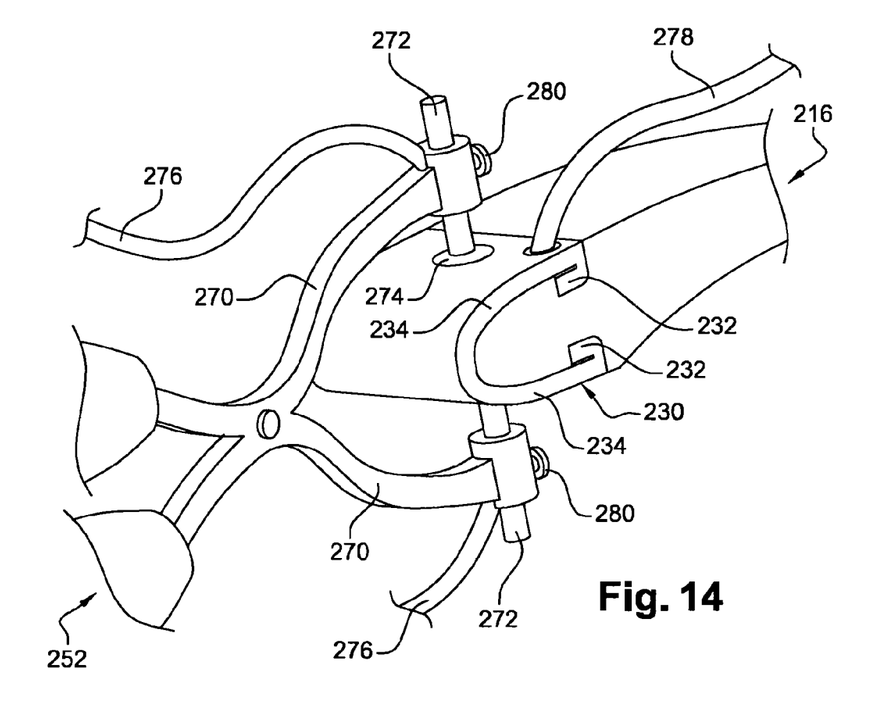

FIGS. 13 and 14 show steps of a method of disassembling the section member 230 from the airfoil of a vane 216 by means of a tool 252 in the form of a pair of pliers having the free ends of its branches 270 carrying respective studs 272 that are to be fastened to the two respective side walls 234 of the section member by welding. The studs are locally welded to the surface without degrading the reinforcement or the airfoil.

There are two studs 272 (but they could be a larger number). In the example shown, each stud 272 extends substantially perpendicularly to the side wall 234 on which it is fastened, the studs being substantially parallel to one another in the example shown. Each stud 272 is fastened to the end of a respective branch 270 of the tool 252 and has one end that is fastened to a corresponding side wall 234 by welding.

In the example shown, the studs 272 are removably fastened to the branches 270 of the tool 252, each branch having a cylindrical end including an axial bore in which the body of a stud is engaged. Each cylindrical end includes a tapped orifice leading to the inside of the bore and having an axial lock screw 280 mounted therein for preventing the stud 272 from moving axially in the bore.

The studs 272 are made of meltable material and they are used as electrodes during the welding, which for example may be of the MIG-TIG-MAG or SMAW type. During welding of this type, an electric arc is generated between the end of each stud 272 and the side wall 234, with the energy of the arc serving to melt the end of the stud so that its molten metal 274, after cooling down and solidifying, serves to fasten the stud onto the side wall. For this purpose, each stud 272 is connected by a conductor 276 to a positive (+) terminal of an electrical power supply, and the section member 230 is connected by a conductor 278 to the opposite, negative (−) terminal of the power supply.

The section member 230 may be disassembled as follows. The section member 230 is connected by the conductor 270 to the (−) terminal of the power supply. The studs 272 are fastened to the branches 270 of the tool 252, which branches are themselves connected to the (+) terminal of the power supply. The branches of the tool and the studs are spaced apart from each other by handling the tool. The vane 216 is engaged between the branches of the tool, which branches are then moved towards each other until the ends of the studs become flush with the outer surfaces of the side walls 234 of the section member. Electric arcs are then generated between each of the studs 272 and the section member 230 so as to weld the studs onto the section member, as described above. Welding current may be activated either by means of a button arranged on the pliers where it is accessible to an operator, or else by means of a control unit located elsewhere. The branches of the tool are then spaced apart from each other, thereby elastically deforming the section member by spreading its side walls apart from each other until the rims 232 are disengaged from the grooves in the airfoil. The tool 252 is then moved in translation away from the vane in order to remove the section member from the airfoil.

This disassembly method and device may be used for disassembling the section members shown in FIGS. 2 to 9.

In another variant that is not shown, the thickness of the section member varies. This side wall situated on the pressure face of the airfoil may for example be thicker than the side wall on the suction face of the airfoil, so as to take account of the different pressures exerted on those walls in operation. The thicker a side wall of the section member, the greater its stiffness, and the more it withstands being deformed (such as being lifted off).

The invention may be applied to vanes or blades other than a set of guide vanes for a bypass stream, and for example it may be applied to the blades of a turbine engine fan. Likewise, the invention is not limited to the field of vanes and blades for a turbine engine.

The invention claimed is:

1. A disassembly method for disassembling a piece of reinforcement from a part,
   the reinforcement being releasably fastened on the part and including resilient rims co-operating with grooves of the part,
   the method comprising:
   fastening at least one metal stud on side wall of the reinforcement and at least one other metal stud on a second side wall of the reinforcement,
   the studs extending perpendicularly to the side walls on which the at least one metal stud and the at least one other metal stud are respectively fastened;
   moving the studs apart from each other to space apart the side walls of the reinforcement and disengaging the resilient rims from the grooves of the part;
   and
   removing the reinforcement from the part,
   wherein the studs are fastened to the reinforcement by welding,
   the studs being used as electrodes for the welding during which at least one electric arc is to be generated between the reinforcement and a first end of each stud to melt the first ends or to melt a filler metal,
   thereby forming molten metal serving to fasten the first end of each stud to an outer surface of the side walls of the reinforcement, and
   a second end of each stud extending outward from the side walls of the reinforcement.

2. A disassembly method according to claim 1, wherein the studs are fastened respectively to ends of two branches of a pair of pliers that is used for spacing the studs apart from each other.

3. A disassembly method according to claim 1, wherein the part is a turbine engine vane or blade, including an airfoil and a piece of reinforcement on at least one edge of the airfoil, each piece of reinforcement covering or forming the edge of the airfoil and extending over an entire longitudinal dimension of the edge of the airfoil, the reinforcement being releasably fastened on the airfoil and including the resilient rims co-operating with the grooves of the airfoil.

4. A disassembly method according to claim 1, wherein the rims are formed by free edges of the side walls folded inwards and towards a middle of the reinforcement.

* * * * *

UNITED STATES PATENT AND TRADEMARK OFFICE
CERTIFICATE OF CORRECTION

PATENT NO. : 9,920,631 B2  
APPLICATION NO. : 14/385926  
DATED : March 20, 2018  
INVENTOR(S) : Florian Tellier et al.

Page 1 of 1

It is certified that error appears in the above-identified patent and that said Letters Patent is hereby corrected as shown below:

In the Claims

Column 10, Line 11, change "stud on side wall" to --stud on a first side wall--.

Signed and Sealed this  
Third Day of September, 2019

Andrei Iancu  
*Director of the United States Patent and Trademark Office*